(12) United States Patent
Satoh et al.

(10) Patent No.: US 7,662,743 B2
(45) Date of Patent: Feb. 16, 2010

(54) NOX PURIFYING CATALYST

(75) Inventors: Naohiro Satoh, Saitama (JP); Osami Yamamoto, Saitama (JP); Koichi Inaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 11/826,108

(22) Filed: Jul. 12, 2007

(65) Prior Publication Data
US 2008/0026932 A1  Jan. 31, 2008

(30) Foreign Application Priority Data
Jul. 31, 2006 (JP) ............... 2006-209055

(51) Int. Cl.
*B01J 23/10* (2006.01)
*B01J 23/38* (2006.01)
*B01J 23/745* (2006.01)
*B01J 35/00* (2006.01)

(52) U.S. Cl. ............. 502/302; 502/527.12; 502/527.13; 502/304; 502/325; 502/349; 502/344; 502/340

(58) Field of Classification Search ............ 502/527.12, 502/527.13, 304, 325, 349, 302, 344, 340; 423/213.2, 213.5, 213.7, 239.1, 239.2
See application file for complete search history.

(56) References Cited

U.S. PATENT DOCUMENTS

| 4,961,917 | A | * | 10/1990 | Byrne ................... 423/239.2 |
| 5,242,677 | A |   | 9/1993  | Cooper et al. |
| 5,354,720 | A |   | 10/1994 | Leyrer et al. |
| 5,473,887 | A |   | 12/1995 | Takeshima et al. |
| 6,677,264 | B1 | * | 1/2004  | Klein et al. ................. 502/74 |
| 6,825,145 | B2 | * | 11/2004 | Tanada et al. ................ 502/64 |
| 6,953,769 | B2 | * | 10/2005 | Yamada et al. ............... 502/302 |
| 7,214,331 | B2 | * | 5/2007  | Jiang et al. ................... 252/373 |
| 2001/0006934 | A1 | * | 7/2001  | Kachi et al. ................... 502/325 |

(Continued)

FOREIGN PATENT DOCUMENTS

EP    1 685 891 A1    8/2006

(Continued)

OTHER PUBLICATIONS

Database WPI, Section Ch, Week 199043, Derwent Publications Ltd., London, GB, AN1990-327378, XP002455909.

(Continued)

*Primary Examiner*—Timothy C Vanoy
(74) *Attorney, Agent, or Firm*—Arent Fox LLP.

(57) ABSTRACT

The present invention provides an NOx purifying catalyst that removes NOx with sufficient efficiency even under low temperature operation such as diesel engine automobiles. An NOx purifying catalyst for processing NOx in exhaust gas by rich/lean control of the air-fuel ratio of the exhaust gas, includes a first catalytic layer containing β-zeolite having iron and/or cerium elements, and a second catalytic layer including a noble metal and cerium oxide-based material; in which the second and the first catalytic layers are coated on a support in that order so that the first catalytic layer is the uppermost layer. The NOx purifying catalyst purifies NOx as showed in Reaction Formulations (1) to (4).

Lean condition 1: $NO + \frac{1}{2}O_2 \rightarrow NO_2$ (1)

Rich condition: $CO + H_2O \rightarrow CO_2$ (2)

$NO_x + H_2 \rightarrow NH_3$ (3)

Lean condition 2: $NO_x + NH_3 + O_2 \rightarrow N_2 + H_2O$ (4).

7 Claims, 1 Drawing Sheet

U.S. PATENT DOCUMENTS

| | | |
|---|---|---|
| 2002/0187893 A1 | 12/2002 | Yamada et al. |
| 2004/0076565 A1 * | 4/2004 | Gandhi et al. ............... 423/235 |

FOREIGN PATENT DOCUMENTS

| | | |
|---|---|---|
| JP | 05-220403 A | 8/1993 |
| JP | 06-316416 A | 11/1994 |
| JP | 2600492 B2 | 1/1997 |
| JP | 11-104493 A | 4/1999 |
| JP | 11-300211 A | 11/1999 |
| JP | 2004-120873 A | 4/2004 |
| JP | 2006-281127 A | 10/2006 |
| JP | 2006-314989 A | 11/2006 |
| JP | 2007-167817 A | 7/2007 |
| JP | 2007-181752 A | 7/2007 |
| JP | 2007-313486 A | 12/2007 |
| JP | 2007-330856 A | 12/2007 |
| WO | WO 98/26867 A1 | 6/1998 |
| WO | WO 02/41991 A2 | 5/2002 |
| WO | WO 02/41991 A3 | 5/2002 |
| WO | WO 2005/044426 A1 | 5/2005 |
| WO | WO 2005/075059 A1 | 8/2005 |

OTHER PUBLICATIONS

Database WPI, Section Ch, Week 200254, Derwent Publications Ltd., London, GB, AN2002-508401, XP002455910.

He, N. et al., "Fe-containing mesoporous molecular sieves materials: very active Friedel-Crafts alkylation catalysts", Applied Catalysis A: General, Elsevier Science, Apr. 17, 1998, pp. 29-36, vol. 169, No. 1, Amsterdam, NL.

Zhang K. et al., "Alkylation of phenol with tert-butyl alcohol catalysed by zeolite Hβ", Applied Catalysis A: General, Elsevier Science, Jan. 2, 1998, pp. 89-95, vol. 166, No. 1, Amsterdam, NL.

Buchanan J. S., "Gasoline selective ZSM-5 FCC additives: Model reactions of $C_6$-$C_{10}$ olefins over steamed 55:1 and 450:1 ZSM-5", Applied Catalysis A: General, Elsevier Science, Jun. 29, 1998, vol. 171, No. 1, Amsterdam, NL.

Chen H-Y et al. "Reduction of $NO_x$ over various Fe/zeolite catalysts", Applied Catalysis A: General, Elsevier Science, Mar. 13, 2000, pp. 159-168, vol. 194-195, Amsterdam, NL.

Gilot P. et al.; "A review of $NO_x$ reduction on zeolitic catalysts under diesel exhaust conditions", Fuel, IPC Science and Technology Press, May 6, 1997, vol. 76, No. 6, Guildford, GB.

\* cited by examiner

NOX PURIFYING CATALYST

This application is based on and claims the benefit of priority from Japanese Patent Application No. 2006-209055, filed on 31 Jul. 2006, the content of which is incorporated herein by reference.

BACKGROUND OF THE INVENTION

1. Field of the Invention

The present invention relates to an NOx purifying catalyst that removes NOx in exhaust gas with sufficient efficiency from, for example, automobiles, and in particular relates to an NOx purifying catalyst that removes NOx with sufficient efficiency even under low temperature operation such as diesel engine automobiles.

2. Related Art

An NOx purifying catalyst that is capable of reducing NOx in the exhaust gas discharged from automobiles and the like efficiently has been investigated. Most importantly, in diesel engine automobiles, the reduction of NOx has been a major challenge, as well as the reduction of PM (particulate material).

Generally, in diesel engine automobiles, an oxidation catalyst (DOC) and a diesel particulate filter (DPF) are provided in the exhaust path of the diesel engine. However, a combination of the conventional DOC and DPF are insufficient if a further reduction of NOx is required in the future.

An example of the process for further reducing NOx in the exhaust gas includes an exhaust purifying device for internal combustion engines using an NOx absorbent disclosed in Japanese Patent No. 2600492. The NOx absorbent absorbs NOx while the air-fuel ratio of the exhaust gas is lean and release the absorbed NOx when the oxygen concentration of the exhaust gas is lowered. Therefore the exhaust purifying device releases the NOx absorbed while the air-fuel ratio of the exhaust gas is lean from the NOx absorbent when the oxygen concentration of the exhaust gas is lowered.

However, alkali metals, alkali earth metals and the like are used in NOx absorbents employed in the exhaust purifying device as disclosed in Japanese Patent No. 2600492. In addition, a noble metal such as platinum is used for the oxidation of CO, HC, and NOx under lean conditions and for the reduction of NOx under rich conditions. According to Japanese Patent No. 2600492, the use of strongly basic materials as the NOx absorbent of the device causes a problem in that the noble metal is readily deactivated and NOx purifying performance is deteriorated, particularly in low temperature operation.

In addition, the use of the strongly basic materials as an NOx absorbent makes binding with SOx, which has higher acidity than NOx, stronger. Therefore, a problem arises in that regeneration after sulfur-poisoning requires a higher temperature, which makes low temperature catalyst regeneration more difficult.

In other words, the device according to Japanese Patent No. 2600492 produces the desired effect when applied to gasoline engines operated primarily under high temperature conditions; however, its NOx reduction effect is insufficient when applied to diesel engines and the like operated primarily, for example, 300° C. or less.

SUMMARY OF THE INVENTION

The present invention was accomplished in view of the foregoing problems. An object of the present invention is to provide an NOx purifying catalyst that removes NOx with sufficient efficiency, even in low temperature operation such as that of diesel engine automobiles.

The present inventors discovered that NOx reducing performance in low temperature operation was improved by combining a first catalytic layer including zeolite-based catalyst having iron and/or cerium elements, and a second catalytic layer including a noble metal and cerium oxide-based material, and by coating so that the first catalytic layer is the uppermost layer. Accordingly, the present invention was accomplished. More specifically, the present invention provides the following.

According to a first aspect of the present invention, an NOx purifying catalyst for purifying NOx in exhaust gas discharged from an internal combustion engine with air-fuel ratios controlled to lean or rich, includes a first catalytic layer and a second catalytic layer. The first catalytic layer includes a β-zeolite having at least one element selected from the group consisting of iron and cerium elements, and the second catalytic layer includes a noble metal and cerium oxide-based material. The second and first catalytic layers are coated on a support in that order, so that the first catalytic layer is the uppermost layer. NOx passing through the first catalytic layer and is oxidized and adsorbed on the second catalytic layer in the lean condition, NOx adsorbed on the second catalytic layer is converted to $NH_3$ by the reaction with a reductant on the second catalytic layer, the $NH_3$ is then transferred to and adsorbed on the first catalytic layer in the rich region, and then the $NH_3$ reacts with NOx to be converted to nitrogen and water.

The NOx purifying catalyst according to the first aspect of the present invention removes NOx with sufficient efficiency as follows. In the condition where the air-fuel ratio of the exhaust gas is set to lean, NOx in the exhaust gas easily diffuses through the upper first catalytic layer, a solid acid catalyst, and reaches the lower second catalytic layer. The NOx contacts the second catalytic layer, and is temporarily adsorbed on the second catalytic layer (hereinafter referred to as "temporary storage") while being oxidized by a noble metal such as platinum in the second catalytic layer. The noble metal such as platinum acts as a catalytic active species that oxidizes NOx (for example, from NO to $NO_2$).

Next, the air-fuel ratio of the exhaust gas is set to rich. NOx adsorbed on the second catalytic layer is converted to ammonia by reaction with the hydrogen generated from a water gas shift reaction, and ammonia diffuses to and is adsorbed on the first catalytic layer (hereinafter referred to as "re-storage"). The re-storage can be achieved easily as the first and the second catalytic layers are coated to be adjacent.

After that, when the air-fuel ratio of the exhaust gas is set back to lean, the ammonia adsorbed on the first catalytic layer and NOx in the exhaust gas are converted to nitrogen and water via ammonia-selective catalytic reduction, and the nitrogen thus produced is released from the surface of the first catalytic layer. As the first catalytic layer is the uppermost layer, the nitrogen produced by the reduction is efficiently released from the uppermost face. At the same time, the temporary storage also undergoes simultaneously.

As described above, by repeating a lean/rich control of the exhaust gas at a predetermined cycle, the catalyst stores NOx temporarily in the second catalytic layer and converts ammonia re-stored in the first catalytic layer into nitrogen and water, and releases them in the lean condition. On the other hand, the catalyst converts NOx stored temporarily to ammonia, and re-stores it in the first catalytic layer in the rich condition. Thus, the catalyst is capable of reducing NOx continuously. NOx removal performance is improved as a cycle of the temporary storage of NOx, the conversion to ammonia, the re-storage of ammonia, the reduction to nitrogen and the release thereof occurs efficiently by producing the multiple layers with a configuration, in which the uppermost layer is the first catalytic layer and the lower layer is the second catalytic layer. The aforementioned function is to be hereinafter described in the embodiments of the present invention in greater detail.

In addition, the solid acid catalyst of the first catalytic layer of the present invention is a β-zeolite. The β-Zeolite is preferably applied to the present invention because of being NOx-permeable and having high ammonia absorption capacity, as well as relatively high heat-resistance. In the present invention, the ion-exchanged zeolite-based catalyst with a transition metal such as Fe and Ce is utilized, as described below.

Moreover, in the present invention, the first catalytic layer is a β-zeolite further including iron and/or cerium elements. As a result, the purification performance, particularly NOx removal performance, is improved. More specifically, it is expected that the iron element adsorbs NOx and the reductant, and the cerium element adsorbs NOx as well as suppressing poisoning of the catalyst by the reductant because of its storage and release ability of oxygen.

The NOx purifying catalyst of the present invention does not "absorb" NOx as the NOx absorbent of Japanese Patent No. 2600492 incorporates NOx, but "adsorbs" it via a two-step process including the temporary storage and re-storage. Additionally, the catalyst is free from strongly basic materials such as alkali- or alkali earth metals. An unconventional beneficial effect of the present invention is that the NOx purifying catalyst of the present invention removes NOx with sufficient efficiency, even in low temperature operation primarily at 300° C. or less such as in diesel engine automobiles, without suffering from deactivation of the noble metal catalyst at low temperature.

The lean condition herein indicates the condition in which the air-fuel ratio (A/F ratio) is high (i.e., the condition in which the fuel concentration is low), and the rich condition herein indicates the condition in which the air-fuel ratio (A/F ratio) is low (i.e., the condition in which the fuel concentration is high).

According to a second aspect of the NOx purifying catalyst of the first aspect of the present invention, the reductant is at least one selected from the group consisting of CO and HC of the exhaust gas, and hydrogen generated from at least one of the CO and HC components contacting with the second catalytic layer.

As described above, in the present invention, NOx adsorbed on the second catalytic layer is converted to $NH_3$ with a reductant on the second catalytic layer. According to the second aspect of the present invention, the NOx adsorbed on the second catalytic layer is converted to $NH_3$ efficiently by the use of the aforementioned reductant in the exhaust gas.

According to a third aspect of the present invention, the NOx purifying catalyst according to the first or second aspect of the present invention, the second catalytic layer further includes heat-resistant inorganic oxide.

In the third aspect of the present invention, the heat-resistant inorganic oxide included in the second catalytic layer enhances the efficiency of the water gas shift reaction at temperatures of 300° C. or more. As a result, the conversion of NOx to ammonia under rich conditions can be achieved more efficiently.

The noble metal, the catalytic active species used, is supported on the heat-resistant inorganic oxide. The heat-resistant inorganic oxide can be widely selected from inorganic oxides such as zirconium oxide-based materials, alumina-based materials, zeolite-based materials, and silica-based materials, in addition to the aforementioned cerium oxide-based material. The noble metal can be supported entirely on the heat-resistant inorganic oxide that includes the second catalytic layer and can be supported on the particular inorganic oxide.

According to a fourth aspect of the present invention, in the NOx purifying catalyst according to the third aspect of the present invention, the heat-resistant inorganic oxide is at least one selected from the group consisting of zirconium oxide-based materials, alumina-based materials, zeolite-based materials, and silica-based materials.

According to fifth aspect of the present invention, in the NOx purifying catalyst according to the fourth aspect of the present invention, the zirconium oxide-based material is at least one selected from the group consisting of zirconium oxide, and a composite oxide of zirconium and a rare earth element.

According to a sixth aspect of the present invention, in the NOx purifying catalyst according to the any one of the first to fifth aspects of the present invention, the cerium oxide-based material in the second catalytic layer is at least one selected from the group consisting of cerium oxide, and a composite oxide of cerium and a rare earth element.

In the fifth aspect of the present invention, by the use of zirconium oxide and/or composite oxide of zirconium and rare earth elements, preferably the composite oxide, the second catalytic layer facilitates the generation of hydrogen as a water gas shift catalyst to promote the formation of ammonia in the second catalytic layer. In the sixth aspect of the present invention, by the use of cerium oxide and/or a composite oxide of cerium and rare earth elements, preferably cerium oxide and the composite oxide, the adsorption of NOx to the second catalytic layer is facilitated. Preferred rare earth elements are at least one rare earth element selected from the group consisting of praseodymium (Pr), lanthanum (La), and neodymium (Nd).

According to a seventh aspect of the present invention, in the NOx purifying catalyst according to the any one of the first to sixth aspects of the present invention, the content of the noble metal decreases gradually or stepwise along the direction from the first catalytic layer to the support.

In the seventh aspect of the present invention, the formation of ammonia by way of the water gas shift reaction is predominant in the upper region (closer to the uppermost face) of the second catalytic layer because the noble metal content is high. On the other hand, the temporary storage of NOx is predominant in the lower region (closer to the support) because the noble metal content is low or no noble metal exists in this region. As a result, NOx reducing efficiency is further improved.

The composition of the second catalytic layer, in which the content of the noble metal decreases gradually or stepwise along the direction from the first catalytic layer to the support, is not particularly limited. However, the content of the noble metal may decrease gradually along the thickness direction, or the second catalytic layer may be composed of multiple layers, in which the content of the noble metal in each layer decreases stepwise. An aspect of the present invention also encompasses the second catalytic layer including a layer containing substantially no noble metal at the side of the support.

DETAILED DESCRIPTION OF THE INVENTION

Figure 1:
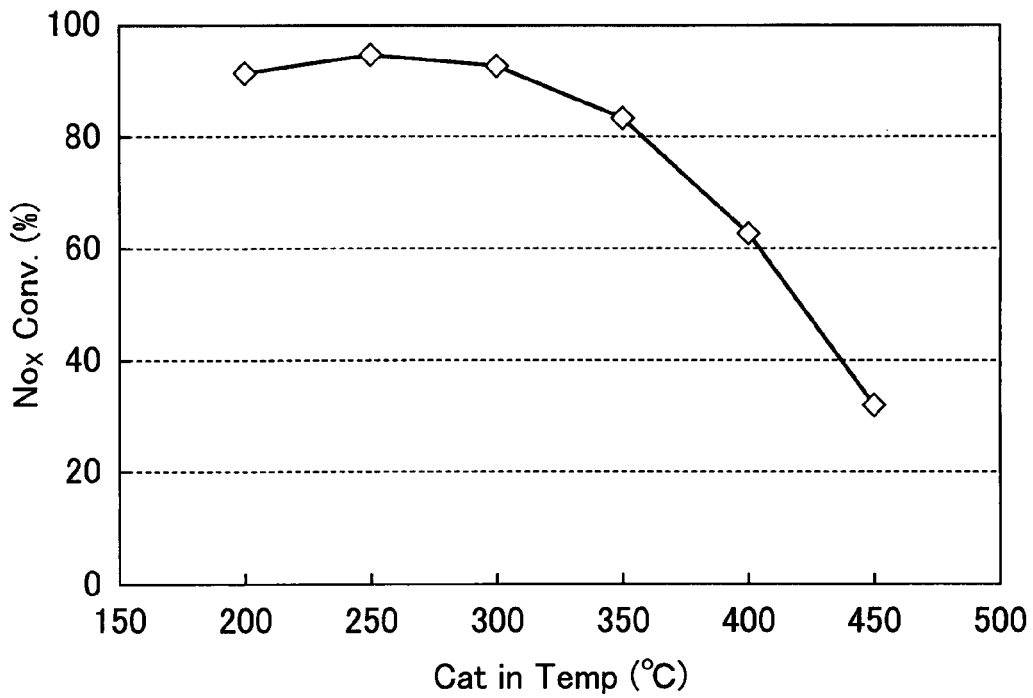
FIG. 1 illustrates the NOx conversion properties versus catalyst temperature in Example 1.

The present invention provides an NOx purifying catalyst that removes NOx with sufficient efficiency, even in low temperature operation condition. Therefore, the present invention can be preferably applied to diesel engine automobiles and the like.

Hereinafter, an embodiment of the NOx purifying catalyst of the present invention is explained in more detail.

Composition of the NOx Purifying Catalyst

The NOx purifying catalyst according to the embodiment is a monolithic catalyst consisting of a support coated with more than one different catalytic layer including a first catalytic layer having a zeolite-based catalyst having iron and/or cerium atoms, and a second catalytic layer including a noble metal and cerium oxide-based material.

First Catalytic Layer

Constituent

The first catalytic layer is preferably used as the uppermost layer that directly contacts the exhaust gas in the NOx purifying catalyst of the present invention. The first catalytic layer preferably contains substantially no platinum components, and more preferably contains none of the noble metal components.

The first catalytic layer includes the solid acid catalyst having ammonia adsorption capacity. A β-Zeolite catalyst is used as the solid acid catalyst. The β-zeolite comprises iron and/or cerium elements.

Although the reason why the purification performance of the exhaust gas, particularly NOx removal performance, is improved by the addition of iron or cerium elements to the zeolite-based catalyst is not clear, it is expected that the iron element adsorbs NOx and the reductant, and the cerium element adsorbs NOx as well as suppresses the catalyst poisoning by the reductant because of its storage and release ability of oxygen. It may be attributed to the combination of these elements generating a synergistic effect that enhances the catalytic properties.

The β-Zeolite used in the present invention generally has a relatively complex three dimensional porous structure composed of straight pores of relatively large pore size aligned in one direction with rounded pores intersecting, thereby so that is has a property allowing diffusion of the cations in the ion exchange process and the diffusion of the hydrocarbons in the reduction process to occur easily, and the like. In comparison with mordenite and faujasite, which only have straight pores aligned in one direction, it can be said that β-zeolite has a unique structure. Such a structural feature of the β-zeolite imparts the high heat resistance, and therefore the catalyst of the present invention has superior heat resistance by using β-zeolite.

The iron element or cerium element may be incorporated into the β-zeolite of the present invention by the addition of a solution of iron and cerium salts, and commercially available iron β-zeolite and cerium β-zeolite may also be used.

Iron or cerium elements in the β-zeolite as prepared above may be exchanged with the cations in the cationic sites. One of the possible factors contributing to the improvement in NOx removal performance of the present invention by use of the ion exchange β-zeolite is stabilization of the β-zeolite structure due to the ion exchange.

Content of Each Component

The content of the β-zeolite in the first catalytic layer may be configured suitably and is not particularly limited, but is preferably in the range of 5 to 300 g/L, more preferably in the range of 30 to 150 g/L per unit volume of the whole catalyst. When the content is 5 g/L or more, the exhaust gas purification ability of the present invention can be achieved, and when the content is 300 g/L or less, permeability of the exhaust gas in honeycomb is maintained.

The amount of iron element added to the β-zeolite is preferably in the range of 0.1 to 10 mass %, more preferably in the range of 0.5 to 5 mass % of the zeolite in oxide equivalent. When the amount is more than 10 mass %, a sufficient number of solid acidic points cannot be assured, which may lead to deterioration of the catalytic activity as well as the heat resistance, and when the amount is 0.1 mass % or more, sufficient NOx removal performance can be achieved.

In addition, when the cerium element is added, the amount of cerium element added to the β-zeolite is preferably in the range of 0.05 to 5 mass %, more preferably in the range of 0.1 to 3 mass % based on the zeolite in oxide equivalent. When the amount is 0.05 mass % or more, the catalyst poisoning due to the reductant in the exhaust can be suppressed; however, when the amount is more than 5 mass %, a sufficient number of solid acidic points cannot be assured, which may lead to deterioration of the catalytic activity as well as the heat resistance.

Second Catalytic Layer

Constituent

Noble metals such as platinum and cerium oxide-based materials are added to the second catalytic layer because the synergistic effect of the cerium oxide-based material and the noble metal enhances NOx removal performance. Although the reason for NOx removal performance being improved is not clear, it may be attributed to the suppression of the poisoning of platinum by reductant and the adsorption of NOx.

Cerium oxide or cerium oxide-zirconium oxide composite oxide, or oxides thereof with auxiliary materials can be used as cerium oxide-based material for use in the present invention. When cerium oxide-zirconium oxide composite oxide is used, it preferably contains 10 mass % or more, more preferably 30 mass % or more, and most preferably 50 mass % or more of cerium in oxide equivalent.

To the cerium oxide-based material used in the present invention, rare earth elements such as praseodymium, neodymium, lanthanum, samarium, and cerium may be added as additives. Such additives are preferably incorporated into the crystal structure of the cerium oxide-based material and stably exist in the form of metal or oxide. As a result, heat resistance and durability of the cerium oxide-based material can be improved.

Thus, cerium oxide and/or composite oxide of cerium and rare earth elements, for example, $CeO_2+Ce-Pr-La-Ox$ are preferred as the cerium oxide-based material.

Cerium oxide-based material can be prepared by a commonly known method in the art, as well as by employing a commercially available source. For example, according to the method disclosed in Japanese Unexamined Patent Application Publication No. Hei 6-316416, the cerium oxide-based material can be prepared by mixing nitrate salts of praseodymium, neodymium, lanthanum, samarium, and the like with cerium sol, and optionally with zirconium sol, followed by drying and calcination.

Heat resistant inorganic oxides other than cerium oxide such as zirconium oxide-based material, alumina-based material, and silica-based material may be added to the second catalytic layer. The zirconium oxide-based material is preferably cerium oxide and/or a composite oxide of zirconium and rare earth elements, and more preferably a composite oxide such as Zr—Nd—Ox.

The second catalytic layer contains a noble metal and cerium oxide-based material, preferably a noble metal supported on a cerium oxide-based material and a noble metal supported on a zirconium oxide-based material as the catalytic active species. As the noble metal, platinum is required as an essential component, but gold, palladium, and rhodium may be added as necessary; however, platinum is preferred because of its high activity.

Although the reason why the purification of NOx in the exhaust gas by the use of platinum is not clear, it may be attributed to NO, the major component of the exhaust gas, being oxidized to $NO_2$ by platinum, and the adsorption of $NO_2$ by the cerium component used in the catalyst of present invention facilitating the reaction with the reductant.

The catalytically active noble metal supported on the cerium oxide-based material or a heat-resistant inorganic oxide other than the cerium oxide-based material (hereinafter simply referred to as "heat-resistant inorganic oxide") is used. The noble metal can be supported entirely on the cerium oxide-based material and heat-resistant inorganic oxide that includes the second catalytic layer, and can be supported on the particular inorganic oxide. The particular inorganic oxide preferably includes the cerium oxide-based materials that have high specific surface area and heat resistance, and such cerium oxide-based material preferably includes a small amount of rare earth elements such as lanthanum (La) and praseodymium (Pr) in the crystal structure so that the heat resistance is improved. γ-alumina is preferred as another heat-resistance inorganic oxide.

Content of Each Component

The catalytically active noble metal content in the second catalytic layer is preferably in the range of 0.1 to 20 g/L, and more preferably in the range of 1 to 10 g/L per unit volume of the whole catalyst. When the content is 0.1 g/L or more, the catalysis shows sufficient purification ability, and when the content is more than 20 g/L, no further improvement in the performance is achieved.

When a noble metal other than platinum is used in combination with platinum as the catalytic active species, the amount of platinum is preferably 50% or more, more preferably 70% or more, and most preferably 90% or more of the total amount of noble metals.

The content of cerium oxide-based material and heat-resistant inorganic oxide used in the second catalytic layer is preferably in the range of 10 to 300 g/L, more preferably in the range of 30 to 150 g/L per unit volume of the whole catalyst of the present invention. When the content is 10 g/L or more, the exhaust gas purification ability of the present invention can be achieved, and when the content is 300 g/L or less, permeability of the exhaust gas in the honeycomb is sufficiently maintained.

The content of cerium oxide-based material is preferably in the range of 1 to 300 g/L, and more preferably in the range of 10 to 200 g/L per unit volume of the whole catalyst of the present invention. When the content is 1 g/L or more, the exhaust gas purification ability of the present invention can be achieved, and when the content is 300 g/L or less, permeability of the exhaust gas in the honeycomb is sufficiently maintained. When cerium oxide and heat-resistant inorganic oxides are used together, the ratio of cerium oxide to inorganic oxides is preferably in the ratio of 100:0 to 50:50. For zirconium oxide-based material, the content thereof may be arbitrary and is not particularly limited, but is preferably in the range of 5 to 50 g/L, and more preferably in the range of 10 to 30 g/L. More than two kinds of cerium oxide-based materials may be used in combination.

Other Additives

The first and/or second catalytic layers may further include other component, for example, a thermostabilizer or reinforcement such as alumina and silica, adhesion enhancer (binder), and the like.

As the binder, zirconia-based material, alumina-based material, silica-based material and the like may be preferably exemplified. As the thermostabilizer or the reinforcement, alkali, alkali earth, or other metals such as potassium, rubidium, cesium, magnesium, calcium, strontium, barium, antimony, hafnium, tantalum, rhenium, bismuth, gadolinium, holmium, thulium, ytterbium, germanium, selenium, cadmium, indium, scandium, titanium, niobium, chromium, and silver may be preferably exemplified.

Coating Configuration of First and Second Catalytic Layers

The NOx purifying catalyst of the present invention is characterized by that the configuration of the first and the second catalytic layers are specified. The second and the first catalytic layers are preferably stacked on a support in that order so that the first catalytic layer is the uppermost layer. The second catalytic layer, which is lower, is preferably formed so that the content of the noble metal decreases gradually or stepwise along the direction from the first catalytic layer to the support. It implies that the second catalytic layer is not necessarily a monolayer, but may include multiple layers, in which the content of the noble metal in each layer decreases gradually or stepwise.

Function of NOx Reducing System

Next, an NOx reducing system provided with the NOx purifying catalyst of the present invention is explained. In an embodiment of the present invention the NOx purifying catalyst has the composition shown in Table 1, including two layers having an upper and a lower layer, as used in the Examples described later. In this embodiment the upper and the lower layers correspond to the first and the second catalytic layers of the present invention, respectively.

TABLE 1

| | Composition |
|---|---|
| Upper Layer | Fe, Ce ion exchanged β-zeolite |
| | $Al_2O_3$ |
| | Binder |
| Lower Layer | Pt |
| | $CeO_2$ |
| | Ce—Pr—La—Ox |
| | Zr—Nd—Ox |
| | $Al_2O_3$ |

Function Under Low Temperature

First Lean Condition

In the condition in which the air-fuel ratio is lean (standard operating condition of diesel engine), NOx in the exhaust gas passes through the upper layer (first catalytic layer), and reaches the lower layer (second catalytic layer). NOx is oxidized by the noble metal (Pt in this embodiment), for example, No to $NO_2$, which is adsorbed and stored temporarily. Pt acts as a NO oxidation catalyst, and $CeO_2$ and Ce—Pr—La—Ox act as NOx adsorbents.

Rich Condition

Under the condition in which the air-fuel ratio of the exhaust gas is adjusted to be rich, NOx adsorbed on the lower layer under the first lean condition described above is converted to ammonia (Formula 2) by the reaction with the hydrogen generated from the water gas shift reaction (Formula 1), and the ammonia thus formed diffuses to the upper layer, and is adsorbed in the solid acid to be re-stored. Pt/Zr—Nd—Ox and Pt/CeO$_2$ act as the water gas shift catalysts, Pt acts as an ammonia generation catalyst, and Fe and Ce ion-exchanged β-zeolites act as ammonia adsorbents.

$$CO + H_2O \rightarrow H_2 + CO_2 \quad \text{(Formula 1)}$$

$$NOx + H_2 \rightarrow NH_3 \quad \text{(Formula 2)}$$

Second Lean Condition

Under the condition in which the air-fuel ratio of the exhaust gas is set back to lean, the ammonia re-stored on the upper layer and the NOx in the exhaust gas react, and convert to nitrogen by the ammonia selective catalytic reduction (NH$_3$-SCR) (Formula 3), and the nitrogen formed can be released from the surface of the upper layer.

$$NOx + NH_3 + O_2 \rightarrow N_2 + H_2O \quad \text{(Formula 3)}$$

As describe above, according to the catalyst having the aforementioned configuration, NOx removal performance is improved even in low temperature by the cycle of temporary storage of NOx in the lower layer, the conversion to ammonia, the re-storage of ammonia in the upper layer, the reduction to nitrogen, and the release thereof at the upper layer occurs efficiently. In the present invention, low temperature indicates the temperatures of 400° C. or lower, and preferably of 300° C. or lower.

In the present invention, for example, the catalyst may be triple layered including an upper, middle, and lower layer by the lower layer including two layers. In this case, the Pt content in the middle and the lower layers may be different, for example, the middle layer may have higher Pt content than the lower layer. In addition, the middle and lower layers may be configured so that only the middle layer contains Pt, and the lower layer contains no Pt.

In addition to the diesel internal combustion engine as shown in the aforementioned embodiment, the present invention is also applicable to gasoline internal combustion engines. Moreover, the present invention can also be applied to an air-fuel ratio control of a marine engine such as an outboard motor, in which a crankshaft is disposed vertically.

EXAMPLES

Next, the present invention is explained in more detail with reference to the Examples.

Example 1

Preparation of the Nox Purifying Catalyst

A double-layered catalyst, as shown in Table 1, was prepared by the slurry method known in the art. A slurry was prepared for each catalytic layer by mixing starting materials with aqueous media by a ball mill, the support as shown below was coated with the slurry by wash coating so that the proportion of each components was as shown in Table 2, followed by drying and calcination under the conditions shown below, thereby preparing the NOx purifying catalyst.

In the preparation of the slurry for the lower layer of the Example, an aqueous solution of platinum chloride was mixed with the each material.

Support
  Size: 150.7φ×114.3 mm (2038 cc)
  Wall thickness: 4.3 mil
  Material: cordierite
  Shape: flow-through honeycomb structure Drying and Calcination Conditions
  Drying temperature: 120° C. (air)
  Drying period: 1 hour
  Calcination device: electric furnace
  Calcination temperature: 450° C.
  Calcination period: 30 minutes

TABLE 2

|  | Composition | Proportion (g/L) |
|---|---|---|
| Upper Layer | Fe, Ce ion exchanged β-zeolite | 75 |
|  | Al$_2$O$_3$ | 7 |
|  | Binder | 8 |
| Lower Layer | Pt | 4.5 |
|  | CeO$_2$ | 60 |
|  | Ce—Pr—La—Ox | 60 |
|  | Zr—Nd—Ox | 20 |
|  | Al$_2$O$_3$ | 30 |

Test Example 1

The catalyst formed in Example 1 was operated under the operation conditions described below to evaluate NOx removal performance. The results are shown in FIG. 1. The horizontal axis in FIG. 1 represents catalyst temperature and the vertical axis represents conversion rate (volume %).

Evaluation Test Condition

Measurement Conditions
  Catalyst Temperature: A total of six points of 200° C., 250° C., 300° C., 350° C., 400° C., and 450° C.

Proportion of lean-condition to rich-condition: 55 sec/5 sec

Gas Conditions
  Lean condition: 6% O$_2$, 6% CO$_2$, 500 ppm C$_3$H$_6$, 900 ppm CO, 110 ppm NO, 7% H$_2$O, and N$_2$ balance.
  Rich condition: 0% O$_2$, 6% CO$_2$, 500 ppm C$_3$H$_6$, 2% CO, 110 ppm NO, 7% H$_2$O, and N$_2$ balance.

As is apparent from the results shown in FIG. 1, in the NOx purifying system of the present invention using the catalyst as prepared in Example 1, NOx conversion of more than 80% was achieved by the rich/lean control at low temperatures ranging from 200 to 350° C. The result indicates that the catalyst is superior particularly in NOx purification performance at low operation temperatures.

Example 2

The evaluation test was conducted under test conditions similar to those in Example 1, except that the catalyst temperatures were set to a total of five points: 170° C., 200° C., 250° C., 300° C., and 400° C.

Comparative Example 1

The evaluation test was conducted under test conditions similar to those in Test Example 1, except that the catalyst as disclosed in Japanese Patent No. 2600492 (composition: Pt/Rh (Pt/Rh=5/1)+Ba, K, Ce—Zr+$TiO_2$) was used.

Test Example 2

Figure 2:
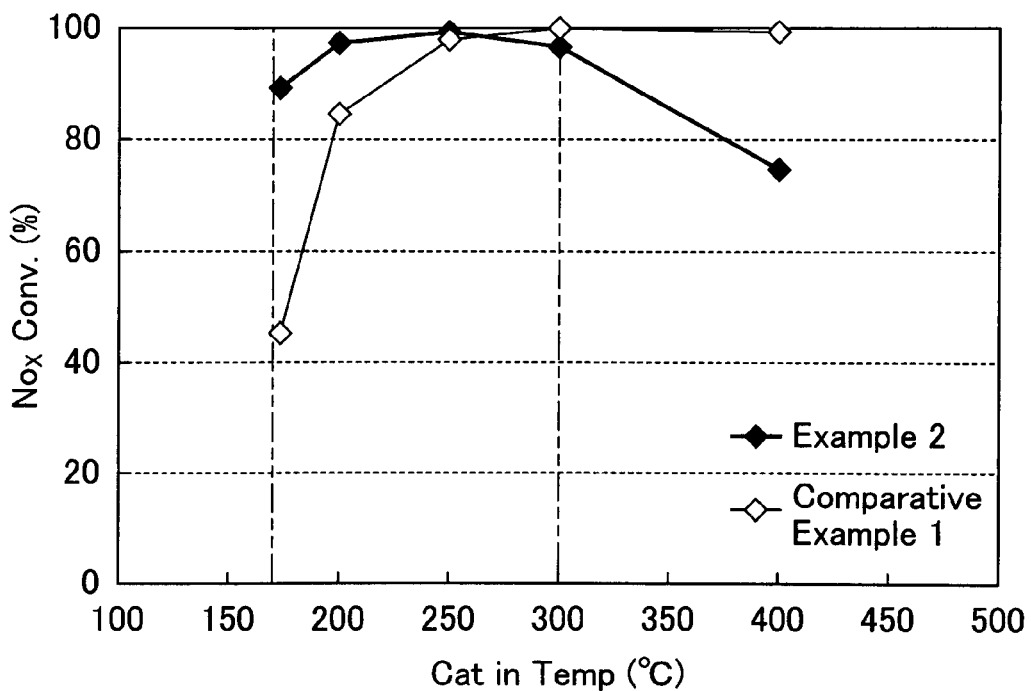
FIG. 2 illustrates the comparison of the NOx conversion properties versus catalyst temperature in Example 2 and Comparative Example 1.

The results of Example 2 and Comparative Example 1 described above are shown in FIG. 2. The horizontal axis in FIG. 2 denotes catalyst temperature, and the vertical axis denotes conversion rate (volume %). As is apparent from the results shown in FIG. 2, in the NOx purifying system of the present invention, NOx conversion of more than 80% was achieved by the rich/lean control at the low temperatures ranging from 200 to 350° C. The results indicate that the catalyst is superior particularly in NOx purification performance at low operation temperatures. In contrast, the NOx conversion at low temperatures below 250° C. of the catalyst of Comparative Example 1 is much lower than that of the catalyst of Example 2. The results indicate that the NOx purifying performance of the catalyst of the Comparative Example 1 at operation temperatures below 250° C. is insufficient.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description, and is only limited by the scope of the appended claims.

What is claimed is:

1. An NOx purifying catalyst for purifying NOx in exhaust gas discharged from an internal combustion engine with air-fuel ratios controlled to be lean and rich, comprising:
   a first catalytic layer that includes a β-zeolite having at least one element selected from the group consisting of iron and cerium elements;
   a second catalytic layer that includes a noble metal and cerium oxide-based material;
   wherein the second and the first catalytic layers are coated on a support in that order, so that the first catalytic layer is the uppermost layer,
   NOx passes through the first catalytic layer and is oxidized and adsorbed on the second catalytic layer in the lean condition,
   NOx adsorbed on the second catalytic layer is converted to $NH_3$ by the reaction with a reductant on the second catalytic layer, the $NH_3$ is then transferred to and adsorbed on the first catalytic layer in the rich region, and the $NH_3$ reacts with NOx to be converted to and water, and
   wherein the content of the noble metal changes in the direction from the first catalytic layer to the support.

2. The NOx purifying catalyst according to claim 1, wherein the reductant is at least one selected from the group consisting of CO and HC components of the exhaust gas, and hydrogen generated from at least one of the CO and HC components contacting with the second catalytic layer.

3. The NOx purifying catalyst according to claim 1, wherein the second catalytic layer further comprises heat-resisting inorganic oxide.

4. The NOx purifying catalyst according to claim 3, wherein the heat-resisting inorganic oxide is at least one selected from the group consisting of zirconium oxide-based materials, alumina-based materials, zeolite-based materials, and silica-based materials.

5. The NOx purifying catalyst according to claim 4, wherein the zirconium oxide-based material is at least one oxide selected from zirconium oxide and composite oxide of zirconium and rare earth elements.

6. The NOx purifying catalyst according to claim 1, wherein the cerium oxide-based material in the second catalytic layer is at least one oxide selected from cerium oxide and composite oxide of cerium and rare earth elements.

7. An NOx purifying catalyst for purifying NOx in exhaust gas discharged from an internal combustion engine with air-fuel ratios controlled to be lean and rich, comprising:
   a first catalytic layer that includes a β-zeolite having at least one element selected from the group consisting of iron and cerium elements;
   a second catalytic layer that includes a noble metal and cerium oxide-based material;
   wherein the second and the first catalytic layers are coated on a support in that order, so that the first catalytic layer is the uppermost layer,
   NOx passes through the first catalytic layer and is oxidized and adsorbed on the second catalytic layer in the lean condition,
   NOx adsorbed on the second catalytic layer is converted to $NH_3$ by the reaction with a reductant on the second catalytic layer, the $NH_3$ is then transferred to and adsorbed on the first catalytic layer in the rich region, and the $NH_3$ reacts with NOx to be converted to nitrogen and water, and
   wherein the content of the noble metal decreases gradually or stepwise in the direction from the first catalytic layer to the support.

* * * * *